United States Patent [19]

Mudge

[11] Patent Number: 4,755,247
[45] Date of Patent: Jul. 5, 1988

[54] PLASTIC NET COMPOSED OF CO-EXTRUDED COMPOSITE STRANDS

[76] Inventor: Richard C. Mudge, 3113 39th Ave. South, Minneapolis, Minn. 55406

[21] Appl. No.: 895,433

[22] Filed: Aug. 11, 1986

Related U.S. Application Data

[62] Division of Ser. No. 593,829, Mar. 27, 1984, Pat. No. 4,656,075.

[51] Int. Cl.<sup>4</sup> ............................................. B32B 31/00
[52] U.S. Cl. ................................ 156/244.15; 156/296; 264/DIG. 81; 428/110
[58] Field of Search ........................ 156/244.15, 296; 264/DIG. 81; 428/110

[56] References Cited

U.S. PATENT DOCUMENTS

| | | | |
|---|---|---|---|
| 3,607,509 | 9/1971 | Schrenk | 156/244.15 |
| 3,723,218 | 3/1973 | Gaffney | 156/244.15 |
| 4,152,479 | 5/1979 | Larsen | 156/244.15 |

*Primary Examiner*—James J. Bell
*Attorney, Agent, or Firm*—Vidas & Arrett

[57] ABSTRACT

An improved plastic net product and its method of manufacture. Intersecting strands of plastic are extruded to form a net structure. Each strand is comprised of a plastic core of a first polymer sandwiched between layers of another polymer, all of which are co-extruded.

12 Claims, 2 Drawing Sheets

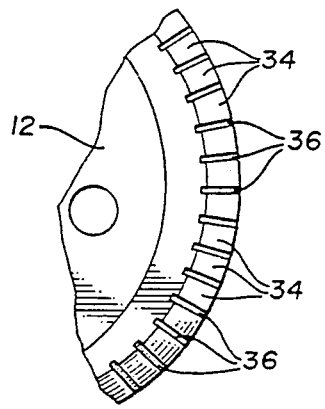
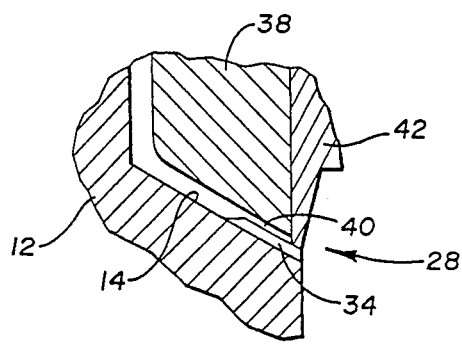
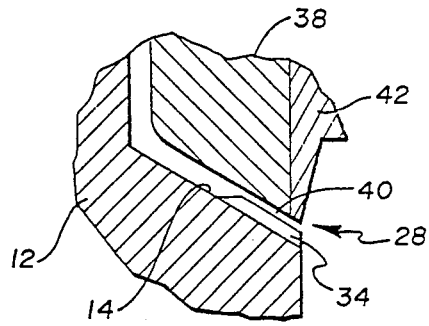
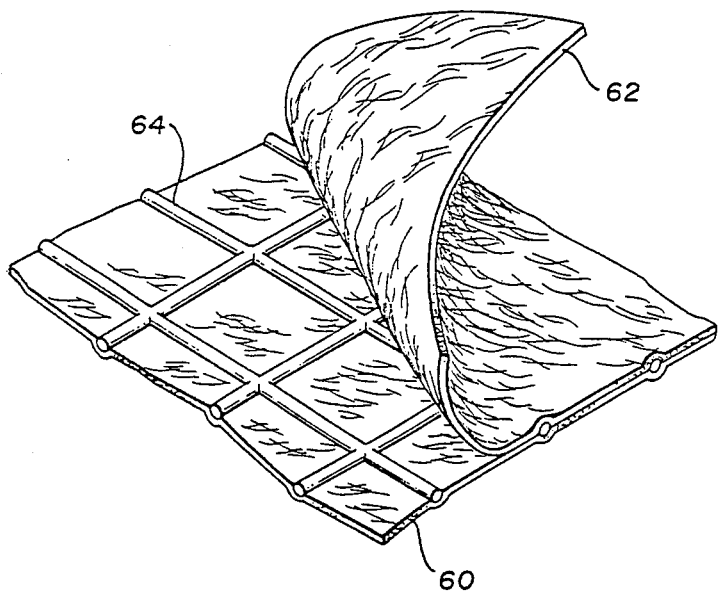

PLASTIC NET COMPOSED OF CO-EXTRUDED COMPOSITE STRANDS

This is a division of application Ser. No. 593,829, U.S. Pat. No. 4,656,075 filed Mar. 27, 1984.

BACKGROUND OF THE INVENTION

This invention relates to the manufacture of plastic net products and in particular to an improved plastic net product and method for manufacturing same.

The continuous extrusion of plastic net started in about 1956 with the process described in the Mercer U.S. Pat. No. 2,919,467. Since that time, many patents have issued in the United States as well as in other countries describing improvements and refinements in the continous extrusion process.

The initial extrusion process has developed along two basic lines: the first, in which plastic sheet is extruded and holes are formed therein to provide a net-like structure, and the second, in which individual plastic strands are extruded in an interconnecting network to provide the net-like structure. This invention is specifically concerned with a variation in the latter of the two.

Methods for practicing the latter technique are well known. For instance, U.S. Pat. Nos. 3,700,521; 3,767,353; 3,723,218; 4,123,491; 4,152,479 and 4,190,692 show apparatus and methods for making net by continuous extrusion of strands.

The disclosures of the above-mentioned issued patents are incorporated by reference into the present specification as are all of the patents which may be referred to hereinbelow in further description of this invention.

In all of these patents at least one set of strands is extruded through a plurality of spaced individual orifices. A second set of strands in the net structure may be extruded through a second set of spaced individual orifices or a second set of strands may be preferentially extruded periodically through a continuous annular orifice slit. In all cases the two sets of strands are extruded such that the individual strands intersect at an angle and form integral joints in the extruded plastic net. The resulting extruded flat sheet in one process or tube of plastic net in another process is cooled to set the plastic in the strands, as for example in a water bath, and the net is drawn away from the extrusion orifices by nip rolls or other suitable drawing means. When a tube of net is extruded, it is usually drawn over a cylindrical mandrel which may stretch the strands and enlarge the openings in the net structure. Such stretching of the strands over the mandrel preferentially orients the plastic but in practice the net is characterized as being "unoriented".

For many applications, it is desirable to further stretch the net strands and more fully orient the plastic and this may be done, where as in the case of a tube of extruded net, the tube is heated and stretched longitudinally to further elongate and orient the strands. Stretching the tube causes it to collapse while the tube is being stretched longitudinally. If the tube has been slit and formed into a flat sheet of extruded net, the flat sheet may be heated and one set of strands may be stretched and oriented in one direction, and in a second separate step, the second set of strands may be stretched to orient the strands in a second direction. Some plastic net may be oriented at room temperature but as a practical matter the net is heated to speed up and facilitate orientation of the net.

A significant problem in the manufacture of high temperature oriented netting such as nylon or other polyamides and polyester netting is that such materials have a low-melt-strength and degrade easily. The low-melt-strength of such polymer resins makes it difficult to produce a uniform extruded net and also makes it difficult to produce a quality oriented product.

Also, while the extrusion process works very well for the extrusion of non-polar polyolefins such as polypropylene, other resins which are polar such as the aforementioned nylon or other polyamides, and other low-melt-strength resins tend to stick to the extrusion die. The degradation of molten resin during extrusion is a problem because degraded material builds up on the die lips. This makes an equipment shut down necessary approximately every six-eight hours to clean the die parts and interrupts the continuous process.

Both low-melt-strength and resin degradation have been found to present major problems in the extrusion of net-like products of nylon, polyester and the like.

This invention has as an objective, the successful and continuous extrusion of low-melt-strength polymer net product without die build-up.

Also, since fusible net products are being used in greater and greater quantities as a reinforcing structure in fabric-to-fabric laminates such as paper toweling, reinforced tissue and the like, the net product of this invention may be used to improve these laminates. In some forms of the invention, the net product may also utilize a co-extruded outer layer of heat sealable polymer carried by a high temperature core as a fusible adhesive for heat bonding or laminating such tissues, fabrics and the like, together with the reinforcing net product sandwiched therebetween. For such uses, the extruded fusible net product of this invention has, among other advantages, that of uniformity, dimensional stability and high strength as compared to other reinforcing products.

It is, therefore, another object of this invention to provide an improved co-extruded net product which not only functions to reinforce such laminates but also provides the adhesive necessary to hold the laminate together.

These and other objects of the invention will be apparent from the description provided hereinbelow.

SUMMARY OF THE INVENTION

In accordance with this invention it has been unexpectedly found that individual interconnecting strands of polymer individually extruded to form net-like structures can be co-extruded in the form of composite laminar strands. As provided by the invention, laminar flow of a plurality of polymers, including copolymers, through a coextrusion die to form individual strands has been found, contrary to expectation, to result in extruded composite strands which exhibit laminar structure. It was fully expected to the contrary that extrusion of laminar flow through the relatively small strand orifices of the die coupled with the shear action created when intersecting strands are formed by the die would result in disturbance of the laminar flow and mixing of the plurality of polymers to provide a strand of mixed polymers without a distinguishing laminar structure, particularly at the strand intersections or joint areas.

In one preferred form, the invention provides a net-like structure composed of individually extruded strands, each strand of which is formed of a low-melt-strength polymer sandwiched between outer layers of a more stable polymer material as each strand emerges from a three-layered die. Three-layered strands are referred to herein as being "tri-extruded".

A more uniform extrusion results when the low-melt-strength resin is encapsulated between two high-melt-strength resins. Typical high-melt-strength resins are polypropylene, high-density polyethylene, low-density polyethylene and linear low-density polyethylene. Polyester is a preferred high temperature resin because of its relatively low cost and low orientation temperature. The encapsulation of polyester or the like between two high-melt-strength resins such as two polyolefins prevents build up of degraded resin at the die lips. The reduced build up minimizes extrusion down time and makes the operation more economical. The term polymer is used herein in a general sense to include various copolymers as well.

The composite net-like product of the invention may be oriented either uniaxially or biaxially in known manner. Even orientation of "tri-extruded" (referring to three laminar layered strands) net, such as polyester between polyolefins (a preferred form of the invention) does not pose a problem since polyester is oriented at about 200°–220° F. which is lower than the melting point of most polyolefins.

In another preferred embodiment of the invention, a net product is provided in which the outer polymer on the strands is heat sealable.

The co-extrusion and specifically tri-extrusion of a net-like product in the film form is known and described in U.S. Pat. No. 4,410,587. However, this patent does not suggest that laminar flow of polymers through a co-extrusion or tri-extrusion die can be accomplished to provide individual, composite, laminar extruded strands.

BRIEF DESCRIPTION OF THE DRAWINGS

Further details of the invention and the preferred type of extrusion apparatus used in the process may be readily understood by reference to the following description and the drawings in which:

FIG. 6 is a fragmentary to plan view of the die head plate of the extrusion head only;

FIG. 7 is a fragmentary section in enlarged detail of part of FIG. 1 taken in the area marked 7 of FIG. 1 with the die striker in a lowered position;

FIG. 8 is a fragmentary view similar to that of FIG. 7 but with the striker in a raised position, and FIG. 9 is a pictorial view of a form of the netting of the invention used as a sandwiched reinforcing element in a piece of reinforced tissue.

DETAILED DESCRIPTION OF THE INVENTION

Figure 1:
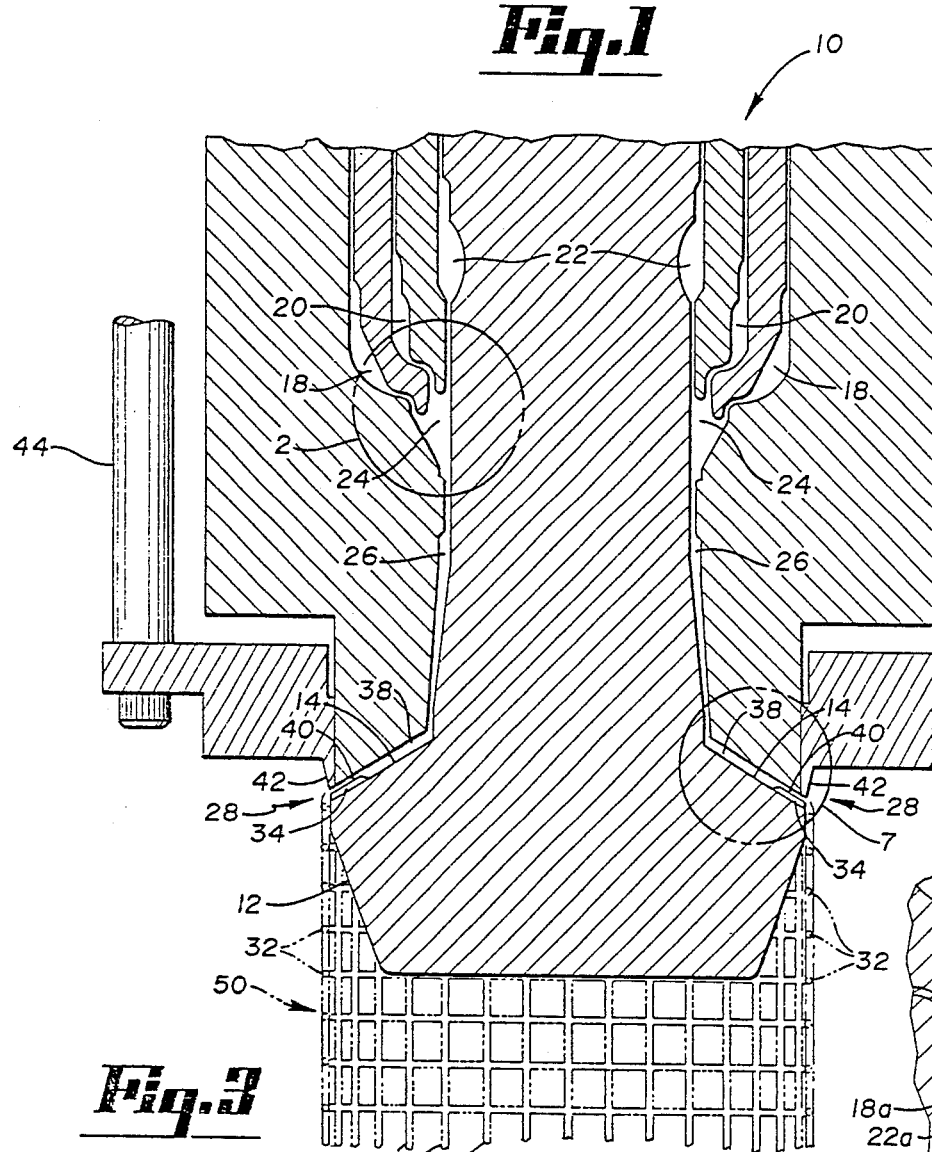
FIG. 1 is an elevational cross section on the vertical axis of a portion of an extrusion die.

Generally, in accordance with the invention, plastic machine-direction strands are continuously extruded through a plurality of spaced orifice openings which are annularly disposed about an extrusion die head. An adjacent continuous orifice extending annularly about the die head is alternately covered and uncovered so as to provide, each time it is uncovered, an interconnecting transverse-direction strand. The mechanism which is moved to alternately cover and uncover the continuous annular orifice is referred to herein as a striker.

The extrusion produced by the above structure comprises a tube of plastic net which in general has rectangular-shaped openings extending along the length of the tube.

As is also known in the prior art, slitting the tube at the end remote from the extrusion die allows the net-like product to be flattened into a sheet-like form which may then be subjected to orientation procedures and other treatment as is well known in the art.

Turning now specifically to the drawing Figures, preferred embodiments of the invention will be described in detail as involving the tri-extrusion of a network of composite strands each of which is comprised of a laminated, extruded structure exhibiting a distinct inner layer sandwiched between oppositely disposed outer layers of polymer material. It is to be understood, that the invention is also applicable to co-extruded forms generally such as a two-layer type. However, it will be described with respect to the three-layer or tri-extruded preferred type.

Figure 2:
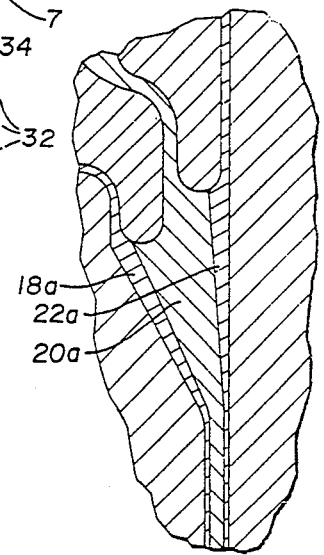
FIG. 2 is an enlarged fragmentary detail of part of the extrusion die of FIG. 1 taken in the area marked 2 in FIG. 1.

Referring to FIG. 1, an annular extrusion die 10 is shown in part as including an annular extrusion head 12. Die 10 is of the type generally known to the art and will include standard features such as support bolts and adjustment structures (not shown) as are known and familiar. However, the die differs in one important respect. In die 10, three separate reservoirs 18, 20 and 22 of polymer materials 18a, 20a and 22a (shown in FIG. 2), respectively, are maintained under pressure and provided to the die by an extrusion system (not shown) and individual polymeric material flow is supplied to die 10 as indicated to the annularly disposed reservoirs 18, 20 and 22. All of these reservoirs communicate and direct flow into a common annular reservoir 24. Reservoir 24 receives the three separate flows of polymer materials from 18, 20 and 22, respectively, which come together in annular reservoir 24 in a three-layer laminar flow pattern which exits from reservoir 24 into a common annular feed channel 26. This is best seen in FIG. 2 which shows three laminar layers of flowing polymer 18a, 20a and 22a. The three-layers flow past the die lips, generally indicated at 28, to form composite three-layer strands in an interconnecting network which provides the familiar tubular net-like structure 50 shown in FIGS. 1 and 3.

For the purpose of extruding machine direction strands 30 and transverse direction strands 32, lips 28 of the die are preferably formed as shown and include on the upper die head plate surface 14 a series of raised and spaced lands 34, best seen in FIG. 6, which form therebetween a series of annularly positioned lower die orifices 36 through which the machine-direction strands 30 are continuously extruded from the die.

As can be seen best in FIG. 1, lands 34 on die head plate 14 are spaced from portion 38 of die 10 so as to provide an upper passage 40 above the lands in the form of a continuous annular orifice which extends around the die. Associated with upper passage 40 is a reciprocable striker 42 which may be alternately lowered and raised by a suitable means indicated at 44 to cover and uncover passage 40 (shown uncovered in FIG. 1). Striker 42 contacts the upper surface of lands 34 on its downward stroke as shown.

Figure 3:
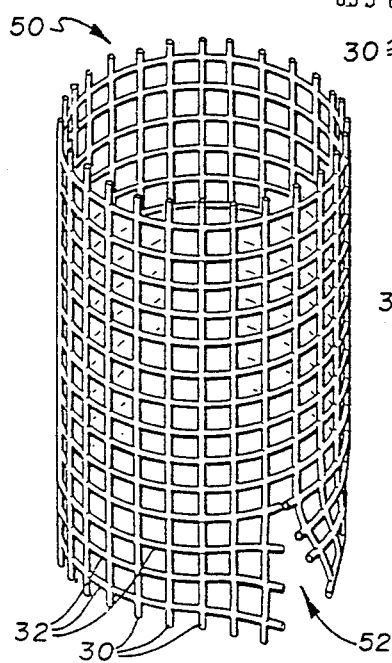
FIG. 3 is a pictorial view of the preferred product, a tubular extruded net, with a small part of the netting cut on the longitudinal axis to illustrate how the tubular netting may be cut and made to open up into a flat sheet of netting.

When striker 42 is in the lower position best seen in (FIG. 7), passage 40 is closed and only the continous extrusion of machine-direction strands 30 occurs through lower orifices 36 which remain open at all times to continuously extrude the spaced plurality of machine-direction strands 30 in annularly distributed pattern as shown in FIGS. 1 and 3. When striker 42 is raised to its upper position (best seen in FIG. 8, passage 40 is uncovered to allow the extrusion of an annular transverse-direction strand 32.

Reciprocating movement of striker 42, which is relatively rapid, provides for the spaced extrusion of transverse-direction strands 32 to interconnect the continuously extending machine-direction strands 30 thereby forming the tubular net-like structure 50 shown in FIGS. 1 and 3.

Figure 4:
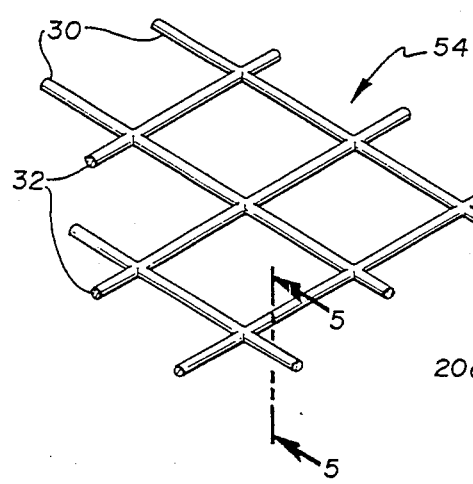
FIG. 4 is a fragmentary view of a small portion of the flattened netting described in FIG. 3 in enlarged scale.

The resulting tube of net generally indicated at 50 is drawn downwardly away from the extrusion die head 12, preferably over a cylindrical mandrel (not shown) and through a water bath (not shown) preferably by a pair of nip rolls (not shown), as is already known in the art. After the plastic strands have set, the tube of net is preferably slit longitudinally in the known manner as generally indicated at 52 in FIG. 3 and opened into a flat sheet 54, a fragment of which is shown in FIG. 4. The sheet may be accumulated on a wind-up roll in the known manner (not shown).

Figure 5:
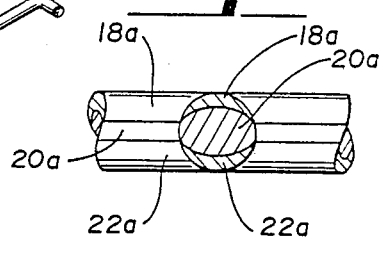
FIG. 5 is a sectional view of a strand of the netting taken along line 5—5 of FIG. 4 and greatly enlarged.

In accordance with the present invention, the strands extruded with the die of FIG. 1 are composite and exhibit a laminated multi-layer structure as is shown in FIG. 5 when polymer 20a differs from polymers 18a and 22a. The multi-layer strucuture shown is the preferred three-layer tri-extruded structure comprising a core polymer 20s sandwiched between a first outer layer 18a and a second outer layer 22a, which are generally oppositely disposed relative to each other.

The unexpected advantage provided lies in the fact that the composite laminar structure provided by the three-layer flow within the die body is maintained and exhibited in the extruded strands even though extrusion is accomplished through the relatively small strand-forming orifices formed in extrusion head 12 coupled with the shearing action provided by the striker 42.

In accordance with a preferred embodiment of the invention, the outer polymer layers 18a and 22a may be relatively stable, high-melting strength polymers, which may be chosen from the group of polyolefin resins. These resins include polypropylene, high-density polyethylene, low-density polyethylene, linear-low-density polyethylene and co-polymers of this group. Layers 18a and 22a may be of the same polymer or different polymer, such as EVA and EMA. A preferred resin for both layers is low-density polyethylene. A more preferred high-melt strength polymer for both layers is polypropylene.

The core polymer material 20a may be chosen from those polymers which are generally described herein as being of the low-melt strength polymers and may be chosen from the group consisting of nylon and other polyamides, polycaprolactones, polyesters and copolymers of this group.

It will be appreciated that the invention is not limited to the aforementioned groups of polymers, copolymers, and the like and that there exists a considerable number of polymers which will fall into the low-melt strength category and the high-melt strength category, relatively speaking.

In the tri-extruded form, a preferred combination comprises an inner core of polyester layer 20a encapsulated or sandwiched between outer layers 18a and 22a of polypropylene.

In another preferred embodiment of the invention (not utilizing the former polymer combination of a low-melt-strength inner core and a high-melt-strength outer polymer) a preferred combination comprises a core layer 20a of polypropylene while the two outer layers 18a and 22a comprise ethylene-methyl acrylate copolymer (EMA), ethylene-vinyl acetate copolymer (EVA), or an ionomer resin such as Surlyn ®, a modified polyethylene marketed by E. I. DuPont de Nemours Co. the former being most preferred. This particular combination of materials when biaxially oriented provides a tri-extruded reinforcement net product particularly useful for tissue reinforcement when sandwiched between two layers of outer covering material such as paper, tissue, foil or the like as schematically indicated in FIG. 9 to form a composite reinforced laminate. The outer covering layers are indicated at 60 and 62, the reinforcing net structure being indicated at 64. The ethylene-methyl acrylate copolymer (EMA) has the advantage of providing a heat fusible adhesive function which heat bonds the reinforcing net-like structure to the outer fabric layers 60 and 62 when the composite is subjected to heat and pressure.

It will be understood that the claims are intended to cover all changes and modifications of the preferred embodiments of the invention herein chosen for the purpose of illustration.

What is claimed is:

1. A method of manufacturing plastic net comprising the steps:
   (a) coextruding a laminar composite of at least different kinds of plastic in superimposed bonded relationship to each other through a plurality of individual openings in a die to form a first plurality of composite plastic strands;
   (b) coextruding a laminar composite of at least two different kinds of plastic in superimposed, bonded relationship to each other from a die to form a second plurality of composite plastic strands to intersect the first plurality of strands thereby forming a net-like structure.

2. In a method of manufacturing plastic net-like structure in sheet form by melt extrusion of the plastic from a die apparatus, the net being formed by extruding two sets of spaced strands of the plastic and in which the first set of spaced strands is extruded in a spaced circular arrangement while the second set of spaced strands is extruded substantially transverse and normal to the strands of the first set to form in combination therewith the net-like structure in tubular form which is then slit to form a sheet in which the strands of the first set are aligned substantially parallel to the length of the sheet and the strands of the second set are aligned at substantially a right angle to the strands of the first set, the improvement comprising the coextrusion from the die apparatus of a laminar composite of at least two different kinds of plastic material making up the strands, the coextrusion being accomplished by establishing separated, annularly distributed flow patterns of the different plastics within the die apparatus and bringing them together in superimposed laminar relationship to each other within the die apparatus prior to their coextrusion from the die apparatus whereby the resultant strands have a laminar structure in cross-section.

3. The method fo claim 1 wherein three layers of polymers are coextruded to form each of the strands, one layer comprising a first kind of polymer sandwiched between the other two layers which comprise a second kind of polymer.

4. The method of claim 3 wherein the first kind of polymer is one of relatively low melt strength and the secoond are of relatively high melt strength.

5. The method of claim 3 wherein the first is a polyester and the second is a polyolefin.

6. The method of claim 4 wherein the first kind of polymer is selected from the group consisting of polyamides, polyesters and copolymers of this group.

7. The method of claim 6 wherein the polyamide is nylon.

8. The method of claim 4 wherein the second kind are selected from the group consisting of polypropylene, high-density polyethylene, low-density polyethylene, linear low-density polyethylene and co-polymers of this group.

9. The method of claim 8 wherein the first layer is polyester and the other two layers are a polyolefin.

10. The method of claim 3 wherein the first kind of polymer is polypropylene and the second kinds are ethylene-methyl acrylate copolymer (EMA).

11. The method of claim 3 wherein the first kind of polymer is polypropylene and the second kinds are ethylene-vinyl acetate copolymer (EVA).

12. The method of claim 11 wherein the second polymer is an ionomer resin.

* * * * *

UNITED STATES PATENT AND TRADEMARK OFFICE
CERTIFICATE OF CORRECTION

PATENT NO. : 4,755,247
DATED : July 5, 1988
INVENTOR(S) : Richard C. Mudge

It is certified that error appears in the above-identified patent and that said Letters Patent is hereby corrected as shown below: Title page:

At Line 73 add:

Assignee: Leucadia, Inc., New York, N.Y.

Column 6, line 43, the words appearing as "least differ-" should appear as "least two differ-".

Column 7, line 11, the word appearing as "fo" should appear as --of--.

Signed and Sealed this

Thirteenth Day of December, 1988

Attest:

DONALD J. QUIGG

Attesting Officer   Commissioner of Patents and Trademarks